United States Patent [19]

Van Basshuysen et al.

[11] Patent Number: 4,481,807
[45] Date of Patent: Nov. 13, 1984

[54] INTERNAL COMBUSTION ENGINE WITH A KNOCKING SENSOR

[75] Inventors: Richard Van Basshuysen, Heilbronn-Biberach; Dieter Stock, Bad Wimpfen, both of Fed. Rep. of Germany

[73] Assignee: Audi NSU Auto Union Aktiengesellschaft, Fed. Rep. of Germany

[21] Appl. No.: 374,633

[22] Filed: May 4, 1982

[30] Foreign Application Priority Data

May 20, 1981 [DE] Fed. Rep. of Germany ....... 3120037

[51] Int. Cl.³ ............................................. G01L 23/22
[52] U.S. Cl. ............................................. 73/35; 73/714
[58] Field of Search ................... 73/35, 593, 654, 660, 73/702, 714, 715

[56] References Cited

U.S. PATENT DOCUMENTS

| 2,319,219 | 5/1943 | Draper et al. | 73/35 |
| 3,128,628 | 4/1964 | Lebow | 73/730 |
| 4,266,421 | 5/1981 | McDougal | 73/35 |
| 4,337,640 | 7/1982 | Muranaka et al. | 73/35 |
| 4,338,823 | 7/1982 | Iwasaki | 73/654 |

Primary Examiner—James J. Gill
Attorney, Agent, or Firm—Kane, Dalsimer, Kane, Sullivan and Kurucz; Kane, Dalsimer, Kane, Sullivan and Kurucz

[57] ABSTRACT

In an externally ignited internal combustion engine with a knocking sensor which comprises a membrane to absorb the vibrations of the engine housing during knocking of the internal combustion engine, cooperating with a vibration absorber, whereby the membrane is formed by a thin walled location of the engine housing or by an opening in the wall of the engine housing which is closed by a membrane plate. The knocking sensor can be mounted at an easily accessible location and it is also assured that the resonance characteristic of all internal combustion engines of a series are the same at the location scanned by the knocking sensor.

5 Claims, 2 Drawing Figures

INTERNAL COMBUSTION ENGINE WITH A KNOCKING SENSOR

This invention relates to an externally ignited internal combustion engine with a knock sensor.

BACKGROUND OF THE INVENTION

The characteristics of internal combustion engines especially externally ignited internal combustion engines are such that under certain conditions they develop certain undesirable vibriations known as knocking. These vibrations, or knockings, may be eliminated by adjusting the timing of the engine. Preferably such an adjustment should be done automatically while the engine is operating. In order to perform such an adjustment first the knockings per se must be detected via knocking sensors.

Hitherto, a place was located by an holographic testing on the engine housing which produces the vibration characteristic of the knocking of all cylinders. At or in the proximity of this location the knocking sensor was mounted. Such sensors are well-known in the art. One type of knocking sensor is disclosed in the Germany Pat. No. DE-OS30 13 684. However, this is disadvantageous because such a location in many cases, is not very well accessible, so that the mounting of the knocking sensor is difficult to achieve in view of the rather tight spatial conditions in the engine space of motor vehicles. Furthermore, in certain operating ranges, other vibrations may occur which are very similar to the ones of a knocking signal and therefore could be misinterpreted as a knocking signal. A further disadvantage of the mounting of the known device consists in that not all engines of the same series or types have the same resonance characteristics die to the manufacturing tolerances. Therefore, wide band vibration absorbers must be used for the sensors, and the electrical signals must be tuned individually for each motor by means of a small band filter.

SUMMARY OF THE INVENTION

It is therefore an object of the invention to provide an internal combustion engine which assures a safe recognition of knocking signals, so that different resonance characteristics of otherwise the same types of internal combustion engines do not have any influence on recognizing the knocking signals.

This object of the invention is obtained by providing an engine with knock sensor which is an integral part of the engine, by making a portion of a wall of the engine housing with a thinner section at one location than the remainder of the engine housing to act as a membrane for the knocking sensor.

Alternatively, an opening is provided in the engine housing which is closed by a membrane plate for detecting the knocking.

DESCRIPTION OF THE PREFERRED EMBODIMENTS

The present invention provides a knocking sensor which is an integral part of the engine, by making a portion of a wall of the engine housing with a thinner section at one location than the remainder of the engine housing to act as a membrane for the knocking sensor. This location can now be provided at a very accessible location, so that the mounting of the knocking sensor does not create any problems. In addition, choosing a standard location assures that in all motors of the same type the same resonance characteristic is present at the location of the knocking sensor. This means, that the knocking signals of the sensors of all the engines have the same resonance frequency, so that a unitary small band vibration absorber can be used for all motors, and therefore, the otherwise required filters can be eliminated. In accordance with the present invention a location is chosen at the engine housing. Considerations of accessibility play a primary role in selection of a location for the knocking sensor, which location is not limited to any particular area on the engine housing.

Figure 1:
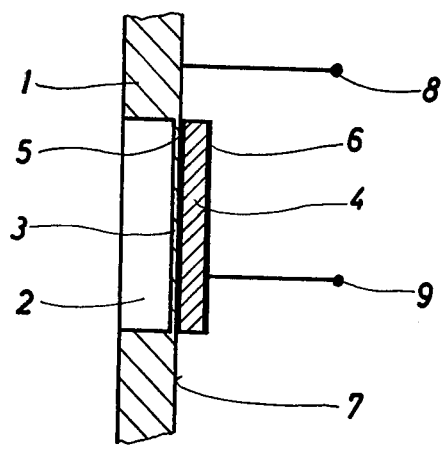
FIG. 1 shows a partial sectional view through an engine housing of an internal combustion engine with a first embodiment of the invention, and FIG. 2 a sectional view similar to the one of FIG. 1 with a second embodiment of the invention.

In the first embodiment, in accordance in FIG. 1, the wall 1 of the housing of the internal combustion engine is designed as a thinner wall by means of a circular-shaped recess, 2, thus being thinner than the rest of the housing. This thin walled location 3 serves as a membrane for a knocking sensor which is provided with a vibration absorber having a piezoelectric element 4. The piezoelectric element is provided with electrodes 5 and 6 at both sides, which are generated by vaporizing of a metal and then depositing it in a thin layer on the piezoelectric material for example. The electrode 5 together with piezoelectric element 4 is bonded by means of an electrically conductive adhesive onto the outer face 7 of wall 1 in the area of membrane 3. When a knocking occurs in the engine, the knocking vibrations are transmitted to membrane 3 and from there to the piezoelectric element 4 which is excited into vibrations and deforms. The element then generates a voltage with a frequency which corresponds to the vibration frequency. This voltage is further transmitted for adjusting the ignition timing through connections 8 and 9 which are in conductive connection with electrodes 5 and 6.

Figure 2:
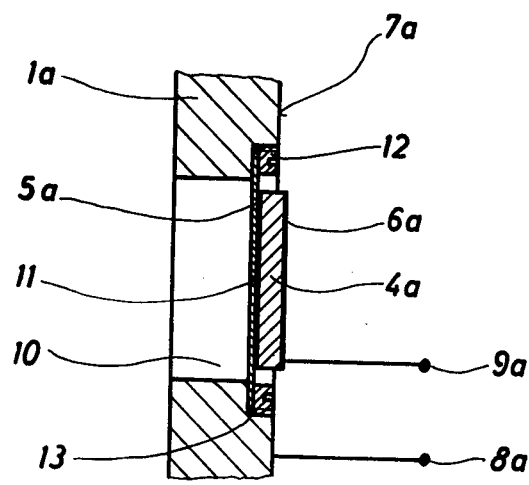

The design of wall 1 of the engine housing illustrated in FIG. 1 may have manufacturing tolerance problems, since exact measurements of the membrane during mass production can only be maintained with a certain effort. In order to prevent this, a preferably circular opening 10 is provided in the wall 1a in accordance with the second embodiment illustrated in FIG. 2, which is closed by a thin metal membrane 11. The metal membrane is retained by means of a screwed-in retainer ring 12 in a recess 13 at the outer face 7a of wall 1a, and cooperates with a piezoelectric element 4, in the manner described heretofore. Since the circular opening 10 can be precisely made without any great effort, the same conditions can be provided for all internal combustion engines of one series or type. Furthermore, it is also important that the membrane 11 is always installed free of stress. This is easily accomplished in the illustrated embodiment, since the membrane 11 is losely placed into recess 13 and the retaining ring 12 is then screwed in.

I claim:

1. An internal combustion engine with a knock sensor integral to an engine housing thereof comprising:
    a plurality of walls;
    a membrane which forms a portion of one of the walls and which picks up vibrations in the engine housing caused by a knocking of the engine wherein the membrane is formed by thinning a part of the wall; and a sensor element attached to said membrane which transforms the vibration picked up in the membrane into electrical signals.

2. The internal combustion engine of claim 1 wherein the wall is thinned by providing a circular recess into said wall.

3. The internal combustion engine of claims 1 or 2 wherein the sensor element comprises a piezoelectric material.

4. An internal combustion engine with a rigid engine housing having a wall with a knock sensor therein comprising a diaphragm which picks up vibrations caused by knocking of the engine wherein said knock sensor cooperates with a means for transforming the vibrations picked up by the diaphragm into electrical signals, and wherein said diaphragm is formed by thinning a portion of said wall.

5. The internal combustion engine of claim 4, wherein said portion of the wall is circular.

* * * * *